(12) United States Patent
Pang

(10) Patent No.: US 12,206,988 B2
(45) Date of Patent: Jan. 21, 2025

(54) ANTI-SHAKE MECHANISM, CAMERA MODULE, AND ELECTRONIC DEVICE

(71) Applicant: VIVO MOBILE COMMUNICATION CO., LTD., Dongguan (CN)

(72) Inventor: Qinquan Pang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 166 days.

(21) Appl. No.: 17/939,925

(22) Filed: Sep. 7, 2022

(65) Prior Publication Data

US 2023/0007179 A1    Jan. 5, 2023

Related U.S. Application Data

(63) Continuation of application No. PCT/CN2021/080399, filed on Mar. 12, 2021.

(30) Foreign Application Priority Data

Mar. 19, 2020    (CN) .......................... 202010196206.1

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC .... H04N 23/687; H04N 23/54; H04N 23/685; H04N 23/57; H04N 23/50; G03B 17/561;
(Continued)

(56) References Cited

U.S. PATENT DOCUMENTS 8,248,497 B2    8/2012    Tanimura et al.
2013/0222685 A1    8/2013    Topliss et al.
(Continued)

FOREIGN PATENT DOCUMENTS

CN    101909155 A    12/2010
CN    102177465 A    9/2011
(Continued)

OTHER PUBLICATIONS

International Search Report issued in corresponding International Application No. PCT/CN2021/080399, mailed Jun. 1, 2021, 4 pages.
(Continued)

*Primary Examiner* — Yogesh K Aggarwal
(74) *Attorney, Agent, or Firm* — IPX PLLC

(57) ABSTRACT

An anti-shake mechanism, a camera module, and an electronic device are provided. The anti-shake mechanism includes: a support plate; a first printed circuit board; a support column fixedly installed on the first printed circuit board; a tilt angle detection mechanism, configured to detect a tilt angle of the support plate and a tilt direction of the support plate; an angle adjustment mechanism, connected between the support plate and the first printed circuit board; and a driving apparatus connected to the tilt angle detection mechanism and the angle adjustment mechanism, respectively. An end of the support column away from the first printed circuit board contacts the support plate. The driving apparatus receives an angle signal collected by the tilt angle detection mechanism, and drives the angle adjustment mechanism to enable the support plate to rotate around the support column.

20 Claims, 2 Drawing Sheets

(58) Field of Classification Search
CPC ............ G03B 30/00; G03B 2205/0023; G03B 2205/0076; H05K 1/189
See application file for complete search history.

(56) References Cited

U.S. PATENT DOCUMENTS

| | | | | |
|---|---|---|---|---|
| 2016/0127646 | A1* | 5/2016 | Osborne | H04N 23/6812 396/55 |
| 2017/0045753 | A1* | 2/2017 | Enta | H04N 23/682 |
| 2019/0129132 | A1 | 5/2019 | Fan et al. | |
| 2019/0227257 | A1 | 7/2019 | Song | |

FOREIGN PATENT DOCUMENTS

| | | | |
|---|---|---|---|
| CN | 105573014 | A | 5/2016 |
| CN | 107079086 | A | 8/2017 |
| CN | 108732781 | A | 11/2018 |
| CN | 110261990 | A | 9/2019 |
| CN | 209787281 | U | 12/2019 |
| CN | 110650274 | A | 1/2020 |
| CN | 111212214 | A | 5/2020 |
| JP | 2008070731 | A | 3/2008 |
| JP | 2008203402 | A | 9/2008 |
| JP | 2011232708 | A | 11/2011 |
| JP | 2015001727 | A | 1/2015 |
| JP | 2015210387 | A | 11/2015 |
| JP | 2017194679 | A | 10/2017 |
| WO | 2010044198 | A1 | 4/2010 |
| WO | 2021185165 | A1 | 9/2021 |

OTHER PUBLICATIONS

First Office Action issued in related Chinese Application No. 202010196206.1 mailed Dec. 17, 2020, 9 pages.
Second Office Action issued in related Chinese Application No. 202010196206.1 mailed Jul. 9, 2021, 7 pages.
Extended European Search Report issued in related European Application No. 21771451.8, mailed May 19, 2023, 8 pages.
Notice of Reasons for Refusal issued in related Japanese Application No. 2022-550018, mailed Jun. 27, 2023, 6 pages.
Office Action issued in related Korean Application No. 10-2022-7029752, mailed Apr. 8, 2024, 11 pages.

* cited by examiner

ANTI-SHAKE MECHANISM, CAMERA MODULE, AND ELECTRONIC DEVICE

CROSS-REFERENCE TO RELATED APPLICATIONS

This application is a continuation of International Application No. PCT/CN2021/080399, filed on Mar. 12, 2021, which claims priority to Chinese Patent Application No. 202010196206.1 filed on Mar. 19, 2020. The entire contents of each of the above-referenced applications are expressly incorporated herein by reference.

TECHNICAL FIELD

The present disclosure relates to the field of communications technologies, and in particular to an anti-shake mechanism, a camera module, and an electronic device.

BACKGROUND

As cameras are increasingly widely applied to mobile phone terminals, requirements for imaging quality of the cameras for photographing and video recording are increasingly higher. Shake caused by holding with a hand or walking when taking pictures and recording videos causes image blur, so that image quality is drastically reduced. This requires an anti-shake stabilization system to be equipped for cameras of the mobile phones, to compensate for an image shift during shake.

At present, in traditional anti-shake technologies, when shake occurs, a shift during shake is compensated by panning or tilting a lens assembly. When the lens assembly is panned or tilted, a lens moves or tilts relative to a photosensitive chip. Optically, an imaging circle of the lens is required to be larger than a chip to cover an imaging area of the chip when the lens moves or tilts relatively, which requires a diameter of the lens to be designed to be relatively large. When the lens assembly is tilted, because the lens is inclined relative to the chip, the focus of surrounding molding is not on a molding surface, which causes blur around the image.

SUMMARY

The present disclosure provides an anti-shake mechanism, a camera apparatus, and an electronic device.

The following technical solutions are used in the embodiments of the present disclosure:

According to a first aspect, an embodiment of the present disclosure provides an anti-shake mechanism, including:
  a support plate;
  a first printed circuit board;
  a support column fixedly installed on the first printed circuit board, where an end of the support column away from the first printed circuit board contacts the support plate;
  a tilt angle detection mechanism, configured to detect a tilt angle of the support plate;
  an angle adjustment mechanism, where the angle adjustment mechanism is located between the support plate and the first printed circuit board, and is connected to the support plate and the first printed circuit board, respectively; and
  a driving apparatus connected to the tilt angle detection mechanism and the angle adjustment mechanism, respectively, where the driving apparatus receives a tilt angle collected by the tilt angle detection mechanism, and drives, according to the tilt angle, the angle adjustment mechanism to enable the support plate to rotate around the support column.

According to a second aspect, an embodiment of the present disclosure further provides a camera module, including: the anti-shake mechanism according to the foregoing embodiment.

According to a third aspect, an embodiment of the present disclosure further provides an electronic device, including: the camera module described in the foregoing embodiment.

In the foregoing solutions of the present disclosure, through the support plate, the first printed circuit board, and the support column fixedly installed on the first printed circuit board, where an end of the support column away from the first printed circuit board contacts the support plate; the tilt angle detection mechanism configured to detect the tilt angle of the support plate; and the angle adjustment mechanism located between the support plate and the first printed circuit board and connected to the support plate and the first printed circuit board, respectively, and the driving apparatus connected to the tilt angle detection mechanism and the angle adjustment mechanism, respectively, where the driving apparatus receives the tilt angle collected by the tilt angle detection mechanism, and drives, according to the tilt angle, the angle adjustment mechanism to drive the support plate to rotate around the support column, this way, the anti-shake mechanism with the foregoing structure has good universality, and can be matched with different camera modules, and the camera module can be integrally installed on the anti-shake mechanism. Therefore, anti-shake at a larger angle can be implemented, and imaging quality of the camera module can be improved.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
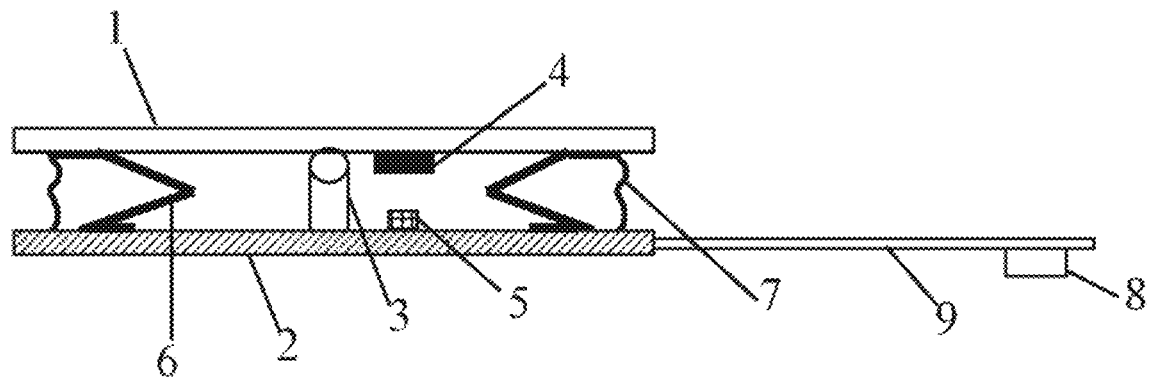
FIG. 1 is a first schematic structural diagram of an anti-shake mechanism according to an embodiment of the present disclosure.

As shown in FIG. 1, the present disclosure discloses an anti-shake mechanism. The anti-shake mechanism includes: a support plate 1; a first printed circuit board 2; a support column 3 fixedly installed on the first printed circuit board 2, where an end of the support column 3 away from the first printed circuit board 2 contacts the support plate 1; a tilt angle detection mechanism, configured to detect a tilt angle of the support plate 1; an angle adjustment mechanism, where the angle adjustment mechanism is located between the support plate 1 and the first printed circuit board 2, and is connected to the support plate 1 and the first printed circuit board 2, respectively; and a driving apparatus connected to the tilt angle detection mechanism and the angle adjustment mechanism, respectively, where the driving apparatus receives a tilt angle collected by the tilt angle detection mechanism, and drives, according to the tilt angle, the angle adjustment mechanism to enable the support plate 1 to rotate around the support column 3.

It should be noted that the tilt angle collected by the tilt angle detection mechanism is used to represent a tilt degree of the support plate 1, which may be a tilt degree of the camera module when a user's hand shakes.

Here, the tilt angle may include a tilt angle of the support plate and a tilt direction of the support plate.

In some embodiments, the driving apparatus is fixed to the first printed circuit board 2. In some embodiments, the driving apparatus is a driving chip.

It should be noted that the driving apparatus receives the tilt angle collected by the tilt angle detection mechanism, and drives, according to the tilt angle, the angle adjustment mechanism to enable the support plate 1 to rotate around the support column 3, thereby enabling the entire camera module to compensate an angle equal to the tilt angle of the support plate 1 in a direction opposite to the tilt direction of the support plate 1, so as to achieve anti-shake.

In some embodiments, driving the angle adjustment mechanism to enable the support plate 1 to rotate around the support column 3 can be enabling the support plate 1 to rotate in a direction close to or away from the first printed circuit board 2, that is, can be enabling any side of the support plate 1 to rotate close to or away from the first printed circuit board 2.

In some embodiments, the support plate 1 is rotated around the support column 3, and a distance between the support plate 1 and the first printed circuit board 2 can be changed. Exemplarily, a side of the support plate 1 may be close to the first printed circuit board 2, and the other side may be away from the first printed circuit board 2.

This way, the anti-shake mechanism with the foregoing structure has good universality, and can be matched with different camera modules, and the camera module can be installed on the anti-shake mechanism integrally. Because the camera module can be installed on the anti-shake mechanism integrally, tilt due to hand shake is compensated by tilting the entire camera module. That is, a lens and a chip in the camera module are tilted in an opposite direction together to achieve optical image stabilization. The lens does not move or tilt relative to the chip, so that better image quality and a larger anti-shake angle can be provided. In addition, optical design for the lens is easier, and a diameter of the lens can be smaller, which is not affected by a user's hand shake.

In some embodiments, the tilt angle detection mechanism includes: a magnetic element 4, where the magnetic element 4 is fixed to a side of the support plate 1 close to the first printed circuit board 2; and a Tunnel Magnetoresistance (TMR) angle sensor 5, where the TMR angle sensor 5 is fixed to the first printed circuit board 2, and the TMR angle sensor 5 is configured to sense an angle of a magnetic induction line of the magnetic element 4. The angle of the magnetic induction line here includes a size and direction of the angle of the magnetic induction line.

It should be noted that, since the magnetic element 4 is fixed to the support plate 1, a change in the angle of the magnetic induction line of the magnetic element 4 can reflect a change in tilt of the support plate 1.

In some embodiments, the TMR angle sensor 5 is fixed to the first printed circuit board 2 and is disposed in a magnetic field of the magnetic element 4. Such design is intended to enable the TMR angle sensor 5 to sense the angle of the magnetic induction line of the magnetic element 4 more accurately.

In some embodiments, the magnetic element 4 is a magnet.

In this implementation manner, the TMR angle sensor 5 is connected to the driving apparatus.

In some embodiments, the angle adjustment mechanism includes: at least one Shape Memory Alloy (SMA) wire 7, one end of the SMA wire 7 is fixedly connected to the support plate 1, and the other end of the SMA wire 7 is fixedly connected to the first printed circuit board 2.

The driving apparatus is connected to the TMR angle sensor 5 and the SMA wire 7, respectively, the driving apparatus receives a tilt angle collected by the TMR angle sensor 5. A current in the SMA wire 7 is adjusted, so that a target SMA wire in the SMA wire 7 shrinks, to drive the support plate 1 to rotate around the support column 3.

Figure 2:
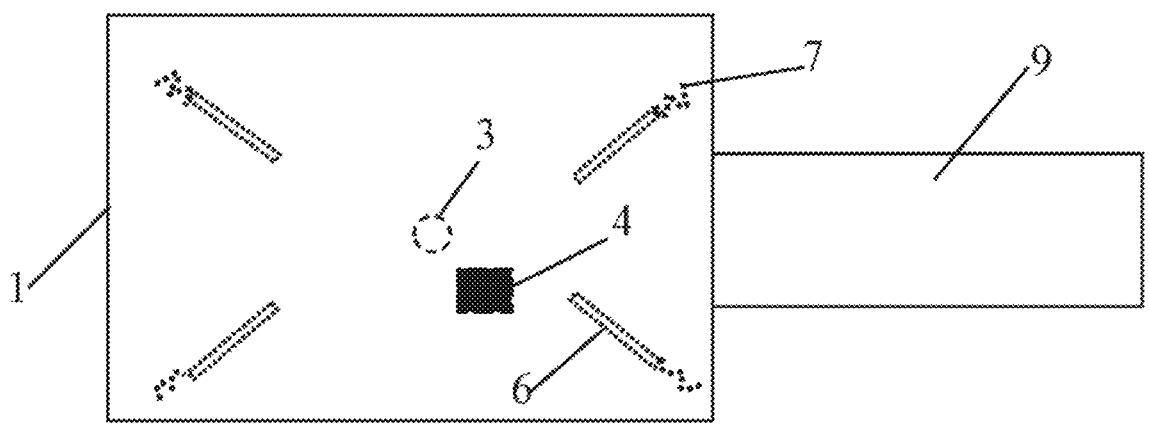
FIG. 2 is a second schematic structural diagram of the anti-shake mechanism according to an embodiment of the present disclosure.

In some embodiments, there may be one, four, or five SMA wires. This is not limited in this embodiment of the present disclosure. Exemplarily, as shown in FIG. 2, four shape memory alloy SMA wires are included and disposed around the support column 3.

In some embodiments, the target SMA wire may be any SMA wire in at least one SMA wire. Exemplarily, in a case that the angle adjustment mechanism includes four SMA wires, the target SMA wire may be any SMA wire in the four SMA wires, and may be four SMA wires or any two SMA wires, which can be determined according to an actual situation.

In some embodiments, the angle adjustment mechanism includes: at least one spring plate 6. The spring plate 6 is located between the support plate 1 and the first printed circuit board 2, and is connected to the support plate 1 and the first printed circuit board 2, respectively.

It should be noted that a function of the spring plate 6 is to support the support plate 1 stably in a non-working state. An initial state of the spring plate 6 has certain elastic deformation, that is, a pre-tension force pulls the support plate 1 down, that is, pulls the support plate 1 toward a direction close to the first printed circuit board 2, so that the center of the support plate 1 is against the support column 3. Therefore, the support plate 1 can rotate around a rotation pivot of the support column 3.

In some embodiments, a material of the spring plate 6 is copper alloy.

In some embodiments, one end of the SMA wire 7 is welded with the spring plate 6 connected to the support plate 1, and the other end of the SMA wire 7 is welded with the first printed circuit board 2. One end of the spring plate 6 is welded with the first printed circuit board 2, that is, a current path of the SMA wire 7 can be formed.

It should be noted that an initial state of the SMA wire 7 is loose. According to the principle of the SMA, when shake of a camera module is detected by a gyroscope, the anti-shake mechanism is enabled, and a current is introduced into the SMA wire 7, and a target SMA wire in the SMA wire 7 shrinks and shortens to generate a pulling force, so as to pull the support plate 1 to rotate around the rotation pivot. Therefore, anti-shake can be implemented for the camera module. By controlling the current size in the SMA wire 7, an anti-shake angle of the support plate 1 can be controlled.

Here, the TMR angle sensor 5 can sense the anti-shake angle of the support plate 1 in real time, and feed the anti-shake angle back to the driving apparatus, so as to achieve closed-loop control and improve accuracy of anti-shake.

In some embodiments, the anti-shake mechanism in an embodiment of the present disclosure further includes: a connector 8; and a flexible circuit board 9 connected to the connector 8 and the first printed circuit board 2, respectively.

Here, the connector is configured to connect and fix a connecting device of the first printed circuit board 2. One end of the connector is connected to the first printed circuit board 2 through the flexible circuit board 9, and the other end is connected to another circuit or circuit board, so that the current flows, and a predetermined function is achieved between the first printed circuit board 2 and the another circuit or circuit board.

In some embodiments, the center of the support plate 1 has a hemispherical groove (not shown in the figure). A first end of the support column 3 is in a protruding hemispherical shape toward the support plate 1 and contacts the hemispherical groove.

Here, the hemispherical groove on the support plate 1 is matched with a hemispherical end of the support column 3. The hemispherical groove is used as a central pivot of rotation, to implement rotation of the support plate 1 around the support column 3. Definitely, other shapes of the support column are also within the protection scope of the present disclosure.

In some embodiments, the support plate 1 is a steel plate.

It should be noted that the camera module is fixed to the support plate 1. Since the support plate 1 is the steel plate, heat of a chip on the camera module can be conducted and dissipated through the support plate 1, the support column 3, and the spring plate 6, so that a temperature of the chip on the camera module can be reduced, reducing an image quality problem caused by a high temperature of the chip.

For the anti-shake mechanism in the embodiment of the present disclosure, through the support plate, the first printed circuit board, and the support column fixedly installed on the first printed circuit board, where an end of the support column away from the first printed circuit board contacts the support plate; the tilt angle detection mechanism configured to detect the tilt angle of the support plate; and the angle adjustment mechanism located between the support plate and the first printed circuit board and connected to the support plate and the first printed circuit board, respectively, and the driving apparatus connected to the tilt angle detection mechanism and the angle adjustment mechanism, respectively, where the driving apparatus receives the tilt angle collected by the tilt angle detection mechanism, and drives, according to the tilt angle, the angle adjustment mechanism to drive the support plate to rotate around the support column, this way, the anti-shake mechanism with the foregoing structure has good universality, and can be matched with different camera modules, and the camera module can be integrally installed on the anti-shake mechanism. Therefore, anti-shake at a larger angle can be implemented, and imaging quality of the camera module can be improved.

Figure 3:
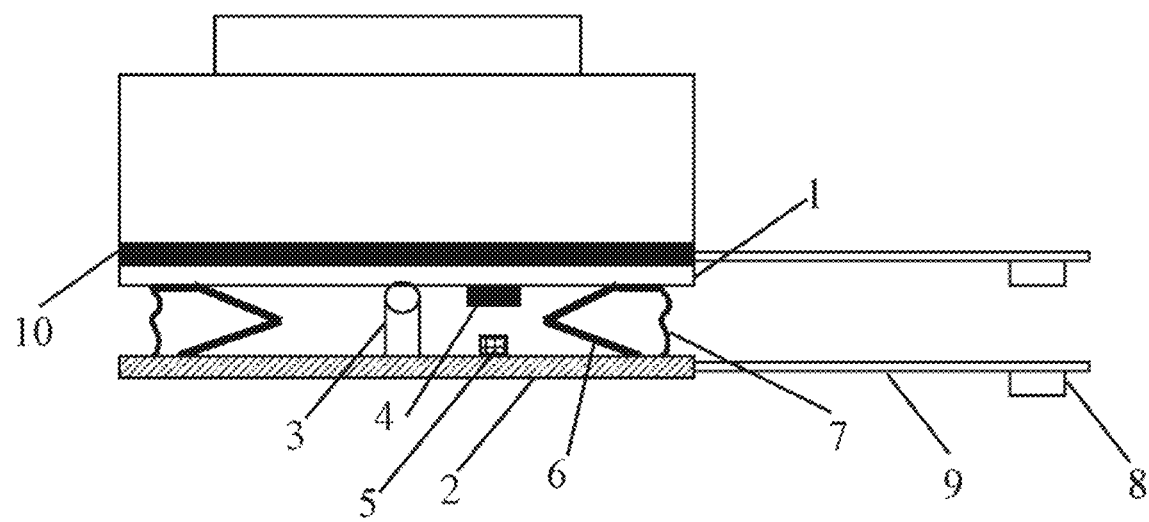
FIG. 3 is a schematic structural diagram of a camera module equipped with the anti-shake mechanism according to an embodiment of the present disclosure.

As shown in FIG. 3, an embodiment of the present disclosure further provides a camera module, including the anti-shake mechanism described in the foregoing embodiment; and a camera module fixed to the anti-shake mechanism.

In some embodiments, the camera module includes a second printed circuit board 10, where the second printed circuit board 10 is fixedly connected to the support plate 1.

In some embodiments, the second printed circuit board 10 is stuck to the support plate 1.

Here, the second printed circuit board 10 is stuck to the support plate 1, so that the camera module can be fixed to the anti-shake mechanism.

Here, the camera module further includes: a connector; and a flexible circuit board. The flexible circuit board is connected to the connector and the second printed circuit board 10, respectively.

Here, the camera module can be integrally installed and fixed to the anti-shake mechanism. Because the camera module can be installed on the anti-shake mechanism entirely, tilt due to hand shake is corrected by tilting the entire camera module. That is, a lens and a chip in the camera module are tilted in an opposite direction together to achieve optical image stabilization. The lens does not move or tilt relative to the chip, so that better image quality and a larger anti-shake angle can be provided.

An embodiment of the present disclosure further provides an electronic device, including the camera module in the foregoing embodiment.

Here, the electronic device may be a portable mobile photographing product, or a camera product having functions of photographing and recording.

The embodiments of the present disclosure are described above with reference to the accompanying drawings, but the present disclosure is not limited to the foregoing specific implementation manners, and the foregoing specific implementation manners are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An anti-shake mechanism, comprising:
   a support plate;
   a first printed circuit board;
   a support column fixedly installed on the first printed circuit board, wherein an end of the support column away from the first printed circuit board contacts the support plate;
   a tilt angle detection mechanism, configured to detect a tilt angle of the support plate;
   an angle adjustment mechanism, wherein the angle adjustment mechanism is located between the support plate and the first printed circuit board, and is connected to the support plate and the first printed circuit board, respectively; and
   a driving apparatus connected to the tilt angle detection mechanism and the angle adjustment mechanism, respectively, wherein the driving apparatus receives the tilt angle collected by the tilt angle detection mechanism, and drives, according to the tilt angle, the angle adjustment mechanism to actuate the support plate to rotate around the support column,
   wherein the angle adjustment mechanism comprises:
      at least one spring plate, wherein the at least one spring plate is located between the support plate and the first printed circuit board, and is connected to the support plate and the first printed circuit board, respectively.

2. The anti-shake mechanism according to claim 1, wherein the tilt angle detection mechanism comprises:
   a magnetic element, wherein the magnetic element is fixed to a side of the support plate close to the first printed circuit board; and a Tunnel Magnetoresistance (TMR) angle sensor, wherein the TMR angle sensor is fixed to the first printed circuit board, and the TMR angle sensor is configured to sense an angle of a magnetic induction line of the magnetic element.

3. The anti-shake mechanism according to claim 1, wherein:
the angle adjustment mechanism comprises at least one Shape Memory Alloy (SMA) wire, wherein one end of the SMA wire is fixedly connected to the support plate, and the other end of the SMA wire is fixedly connected to the first printed circuit board; and
the driving apparatus is connected to a TMR angle sensor and the SMA wire, respectively, wherein the driving apparatus receives a tilt angle collected by the TMR angle sensor and adjusts a current in the SMA wire, so that a target SMA wire in the SMA wire shrinks, to drive the support plate to rotate around the support column.

4. The anti-shake mechanism according to claim 1, further comprising:
a connector; and
a flexible circuit board, wherein the flexible circuit board is connected to the connector and the first printed circuit board, respectively.

5. The anti-shake mechanism according to claim 1, wherein:
a center of the support plate has a hemispherical groove; and
a first end of the support column is in a protruding hemispherical shape toward the support plate and contacts the hemispherical groove.

6. The anti-shake mechanism according to claim 1, wherein the support plate is a steel plate.

7. A camera assembly, comprising:
an anti-shake mechanism comprising:
a support plate;
a first printed circuit board;
a support column fixedly installed on the first printed circuit board, wherein an end of the support column away from the first printed circuit board contacts the support plate;
a tilt angle detection mechanism, configured to detect a tilt angle of the support plate;
an angle adjustment mechanism, wherein the angle adjustment mechanism is located between the support plate and the first printed circuit board, and is connected to the support plate and the first printed circuit board, respectively; and
a driving apparatus connected to the tilt angle detection mechanism and the angle adjustment mechanism, respectively, wherein the driving apparatus receives the tilt angle collected by the tilt angle detection mechanism, and drives, according to the tilt angle, the angle adjustment mechanism to actuate the support plate to rotate around the support column; and
a camera module fixed to the anti-shake mechanism,
wherein the angle adjustment mechanism comprises:
at least one spring plate, wherein the at least one spring plate is located between the support plate and the first printed circuit board, and is connected to the support plate and the first printed circuit board, respectively.

8. The camera assembly according to claim 7, wherein the camera module comprises a second printed circuit board fixedly connected to the support plate.

9. The camera assembly according to claim 7, wherein the tilt angle detection mechanism comprises:
a magnetic element, wherein the magnetic element is fixed to a side of the support plate close to the first printed circuit board; and
a Tunnel Magnetoresistance (TMR) angle sensor, wherein the TMR angle sensor is fixed to the first printed circuit board, and the TMR angle sensor is configured to sense an angle of a magnetic induction line of the magnetic element.

10. The camera assembly according to claim 7, wherein:
the angle adjustment mechanism comprises at least one Shape Memory Alloy (SMA) wire, wherein one end of the SMA wire is fixedly connected to the support plate, and the other end of the SMA wire is fixedly connected to the first printed circuit board; and
the driving apparatus is connected to a TMR angle sensor and the SMA wire, respectively, wherein the driving apparatus receives a tilt angle collected by the TMR angle sensor and adjusts a current in the SMA wire, so that a target SMA wire in the SMA wire shrinks, to drive the support plate to rotate around the support column.

11. The camera assembly according to claim 7, wherein the anti-shake mechanism further comprises:
a connector; and
a flexible circuit board, wherein the flexible circuit board is connected to the connector and the first printed circuit board, respectively.

12. The camera assembly according to claim 7, wherein:
a center of the support plate has a hemispherical groove; and
a first end of the support column is in a protruding hemispherical shape toward the support plate and contacts the hemispherical groove.

13. The camera assembly according to claim 7, wherein the support plate is a steel plate.

14. An electronic device, comprising a camera assembly comprising:
an anti-shake mechanism comprising:
a support plate;
a first printed circuit board;
a support column fixedly installed on the first printed circuit board, wherein an end of the support column away from the first printed circuit board contacts the support plate;
a tilt angle detection mechanism, configured to detect a tilt angle of the support plate;
an angle adjustment mechanism, wherein the angle adjustment mechanism is located between the support plate and the first printed circuit board, and is connected to the support plate and the first printed circuit board, respectively; and
a driving apparatus connected to the tilt angle detection mechanism and the angle adjustment mechanism, respectively, wherein the driving apparatus receives the tilt angle collected by the tilt angle detection mechanism, and drives, according to the tilt angle, the angle adjustment mechanism to actuate the support plate to rotate around the support column; and
a camera module fixed to the anti-shake mechanism, wherein the camera module comprises a second printed circuit board fixedly connected to the support plate,
wherein the angle adjustment mechanism comprises:
at least one spring plate, wherein the at least one spring plate is located between the support plate and the first printed circuit board, and is connected to the support plate and the first printed circuit board, respectively.

15. The electronic device according to claim 14, wherein the tilt angle detection mechanism comprises:
   a magnetic element, wherein the magnetic element is fixed to a side of the support plate close to the first printed circuit board; and
   a Tunnel Magnetoresistance (TMR) angle sensor, wherein the TMR angle sensor is fixed to the first printed circuit board, and the TMR angle sensor is configured to sense an angle of a magnetic induction line of the magnetic element.

16. The electronic device according to claim 14, wherein:
   the angle adjustment mechanism comprises at least one Shape Memory Alloy (SMA) wire, wherein one end of the SMA wire is fixedly connected to the support plate, and the other end of the SMA wire is fixedly connected to the first printed circuit board; and
   the driving apparatus is connected to a TMR angle sensor and the SMA wire, respectively, wherein the driving apparatus receives a tilt angle collected by the TMR angle sensor and adjusts a current in the SMA wire, so that a target SMA wire in the SMA wire shrinks, to drive the support plate to rotate around the support column.

17. The electronic device according to claim 14, wherein the anti-shake mechanism further comprises:
   a connector; and
   a flexible circuit board, wherein the flexible circuit board is connected to the connector and the first printed circuit board, respectively.

18. The electronic device according to claim 14, wherein:
   a center of the support plate has a hemispherical groove; and
   a first end of the support column is in a protruding hemispherical shape toward the support plate and contacts the hemispherical groove.

19. The electronic device according to claim 14, wherein the support plate is a steel plate.

20. The electronic device according to claim 14, wherein the camera module comprises a second printed circuit board fixedly connected to the support plate.

* * * * *